Figure 1:
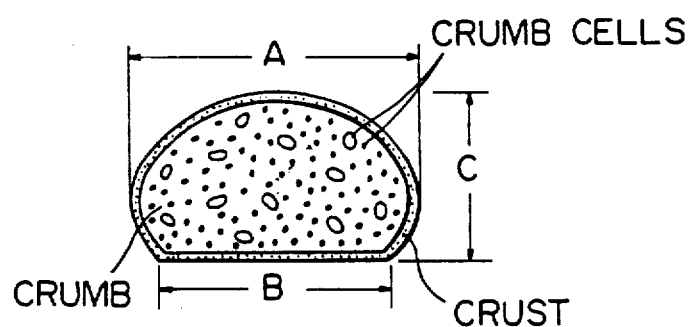

United States Patent [19]
Endo et al.

[11] Patent Number: 4,879,133
[45] Date of Patent: Nov. 7, 1989

[54] MODIFIED GLUTEN PRODUCT AND BREAD IMPROVER COMPOSITION

[75] Inventors: Shigeru Endo, Kawagoe; Satoshi Nomura, Tokorozawa; Shinji Ishigami, Tanashi; Sonoko Karibe, Tokyo, all of Japan

[73] Assignee: Nisshin Flour Milling Co., Ltd., Tokyo, Japan

[21] Appl. No.: 165,526

[22] Filed: Mar. 8, 1988

[30] Foreign Application Priority Data

Mar. 12, 1987 [JP] Japan ................................. 62-57645
Mar. 12, 1987 [JP] Japan ................................. 62-57646

[51] Int. Cl.$^4$ ............................................. A21D 2/00
[52] U.S. Cl. .................................... 426/653; 426/656
[58] Field of Search ....................... 426/549, 653, 656

[56] References Cited
PUBLICATIONS

Tsen, C. C., "Ascorbic Acid as a Flour Improve," The Bakers Digest, Oct. 1964.

Primary Examiner—Donald E. Czaja
Assistant Examiner—Celine T. Callahan
Attorney, Agent, or Firm—Larson and Taylor

[57] ABSTRACT

A new water-insoluble, modified gluten product is now provided, which is produced by kneading a mixture of wheat flour, L-ascorbic acid, cystine and water, and then fractionating the resulting kneaded, dough-like hydrated flour mixture, by repeated water washing, so as to recover a fraction comprising the water-insoluble modified gluten product from the dough. The modified gluten product now produced is useful as a bread improver. This new modified gluten product may further be mixed with cystine and an emulsifier to prepare a bread improver composition, which may be added to a farinaceous bread flour mixture or bread-making dough and is useful to improve the crumb texture, outer profile and crumb palatability of the bread products and also render the bread-making dough as made of the farinaceous bread flour mixture remarkably tolerant to the mechanical workings of the bread-making dough.

5 Claims, No Drawings

MODIFIED GLUTEN PRODUCT AND BREAD IMPROVER COMPOSITION

SUMMARY OF THE INVENTION

This invention relates to a new modified gluten product which is useful as bread improver or additive and which is produced from a dough-like kneaded mixture of hydrated wheat flour, L-ascorbic acid cystine and water and which may be intended e.g. for addition or incorporation to a farinaceous bread flour or a bread-making dough for the purpose of improving the volume, the crumb structure or texture, the crumb smoothness and the external appearance of bread or other bakery products as prepared from such farinaceous flour or dough and also for the purpose of rendering a bread-making dough highly tolerant to the mechanical workings of said dough. This invention also relates to a method for preparing such new modified gluten product. This invention further relates to a bread improver composition which comprises said new modified gluten as one component and which is useful as the additive to farinaceous bread flour or dough for making bread or other bakery products.

BACKGROUND OF THE INVENTION

Hithertobefore, principally, gluten has been produced according to Martin process or dough-ball process, wherein wheat flour is mixed with a volume of water, the resulting mixture is then kneaded into a dough and the dough is allowed to stand for a while until the gluten product and also the starch substance have well been hydrated to form a hydrated wheat flour mass, which is then repeatedly washed with volumes of water further added, to separate the vital gluten and the milky starch substance from the resulting dough-like, hydrated flour mass. Or alternatively, gluten has been produced according to Batter process, wherein wheat flour is mixed with a larger volume of water and the resulting mixture is then kneaded to form a smooth and elastic batter, which is then allowed to stand for a while and subsequently washed with a 2-fold to 5-fold volume of water to give the vital gluten in the form of small curd-like aggregates, along with the milky starch substance, and wherein the gluten aggregates and the milky starch substance are separated from each other by passing through a vibrating screen of 60-150 mesh so that the curd-like, vital gluten is recovered.

The conventional vital gluten products which have been produced by the above-mentioned prior art methods, generally find many and different applications, for instance, for the preparation of baked solid wheat gluten based-bread (called "Fu" in Japanese), the production of sodium glutamate as a seasoning agent, the preparation of a gluten hydrolysate containing amino acids for use as an extender for Japanese soy sauce (called "Sho-yu" in Japanese), the production of new proteinous food products and the like. As one of the many applications of the vital gluten, the addition of the vital gluten to farinaceous bread flour to improve its bread-making properties is also known. However, the effects of the conventional vital gluten for the improvement of the bread-making properties of the farinaceous bread flour are still not satisfactory.

Further, it is also known that some proteinaceous materials are added to the farinaceous bread flour to provide a high protein bread (U.K. Pat. Nos. 1,074,087 and 1,472,738, for example) and that one of the modified gluten products comprising the reaction product of vital gluten and xanthan gum or a hydrophobic liquid is added to the farinaceous bread flour in order to improve the properties of the bread product (U.S. Pat. Nos. 4,198,438 and 4,396,637).

Furthermore, it is known that an oxidizing agent such as L-ascorbic acid, potassium bromate and others; a reducing agent such as glutathione, cystein and the like; enzymes such as amylase, protease and the like; and an emulsifier such as aliphatic acid esters of glycerine, aliphatic acid esters of saccharide and the like, as well as wheat flour protein such as certain activated gluten are used as the bread improver or bread-improving additive for improving the breadmaking properties of the farinaceous bread flour (see, for example, Japaense Patent Publication No. 29685/86; U.K. Pat. No. GB 2126867B; and "Cereal Chemistry" Vol. 57, No.3, pp. 169–174 (1980); Vol. 58, No. 5, pp. 384–391 (1981), published from The American Association of Cereal Chemists).

These known bread improvers are yet not satisfactory as their effects of improving the properties of bread are not sufficient, and as some of the known bread improvers can occasionally give rise to unfavorable flavor and taste of the bread products.

In these circumstances, the demand is lasting for new modified gluten product or new bread improvers which can satisfactorily improve the properties of bread products and other bakery products.

We, the present inventors, earlier have made reaserches in an attempt to provide new bread improvers which can exert satisfactorily the better effects for improving the properties of bread. As a result, earlier we have found that when the known process of preparing gluten from wheat flour is carried out in such a modified manner that one or more oxidizing agents are added to the raw wheat flour and the resulting mixture is then kneaded with addition of water to form a dough-like or batter-like kneaded mixture of hydrated wheat flour, the oxidizing agent and water, it is possible to recover or separate a new, modified gluten product from said dough-like or batter-like kneaded mixture by washing this kneaded mixture repeatedly with water and isolating the water-insoluble gluten fraction from the water-insoluble starch fraction or starchy material and also from the water-soluble fraction existing in said kneaded mixture of the hydrated wheat flour, the oxidizing agent and water, and that the modified gluten product so recovered or separated is useful as a bread-improver, namely as the additive for improving both the bread-making properties of the flour and the properties of bread or other bakery products, such as the volume, the crumb structure or texture, the crumb smoothness or chewing mouth feel and the external appearance of bread.

Further, we earlier have found that when the above-mentioned new modified gluten product is recovered or separated from the dough-like or batter-like kneaded mixture of the hydrated flour, the oxidizing agent and water, it is also possible to recover separately a water-soluble proteinaceous fraction or substance from the water-insoluble starch fraction or substance existing in said dough-like or batter-like kneaded mixture, and that the water-soluble proteinaceous fraction or substance so recovered is also useful as an additive for improving the properties of the wheat flours and the bread products or other bakery products as prepared from the flours. It also has been found earlier that this water-soluble proteinaceous substance so recovered can exert their effects of improving the properties of wheat flours and bread to a satisfactory extent especially when this substance is incorporated to the farinaceous bread flour at a smaller proportion than said new water-insoluble, modified gluten product as prepared by the present inventors.

On the other hand, in recent years, various machines such as the dough divider, rounder, molding machine and so on have been employed in the process of making bread in large scale or in the industries of bakery products. Particularly, the dividing and scaling of the dough into small balls or masses and the making-up of these small masses of the dough are conducted by machines rather than by hands of men. However, when the dough masses have been divided, scaled and made-up by the mechanical working of the machines, it is likely that the bread products as prepared by baking such mechanically worked dough show a reduced volume and a reduced crumb texture, as compared to the bread products which are prepared from the hands-worked dough. Accordingly, it is desirable that the dough for making the bread is rendered to be tolerant to the mechanical workings in the sense that the bread as prepared even by baking the mechanically worked dough can still give a satisfactorily large volume and good crumb structure or texture as much as the bread as prepared from the hand-worked dough. Therefore, there exists a great demand seeking for a new bread improver which can provide a bread-making dough highly tolerant to the mechanical workings in the above sense.

As one result of our earlier researches, we have found that a proteinaceous composition comprising a mixture of the above-mentioned new modified gluten product and the above-mentioned water-soluble proteinaceous fraction or substance which both have been separated from the aforesaid kneaded mixture of the hydrated wheat flour, the oxidizing agent and water is again useful as a bread improver which can provide the bread-making dough tolerant to the mechanical workings in the sense described above.

Thus, we have earlier provided such a bread improver intended for addition to wheat flour or dough for improvement of the volume, the crumb structure and the crumb smoothness of bread, which is selected from (A) a bread improver consisting essentially of a water-insoluble, modified gluten product which is prepared by kneading a mixture of wheat flour, one or more oxidizing agents and water, then washing the resulting hydrated flour mixture so kneaded with water and separating the water-insoluble, modified gluten product from the starch and the water-soluble proteinaceous substance of said hydrated flour mixture, (B) a bread improver consisting essentailly of a water-soluble proteinaceous substance which is prepared by kneading a mixture of wheat flour, one or more oxidizing agents and water, then washing the resulting hydrated flour mixtrure so kneaded with water and separating the water-soluble proteinaceous substance from the starch, the water-insoluble, modified gluten product and the other water-insoluble matters present in said hydrated flour mixture, and (C) an bread improver consisting essentially of a proteinaceous composition which is prepared by admixing the aforesaid water-insoluble, modified gluten product (A) with the aforesaid water-soluble proteinaceous substance (B) (see Japanese patent application Nos. 96205/86; 110103/86 and 110103/86; as well as the corresponding U.S. patent application Ser. No. 040,815; Canadian Pat. Application No. 535,418; Australian Pat. Application No. 71986/87 and European Patent Application No. 87 106023.2).

Yet, the conventional gluten products, as well as the modified gluten product as earlier provided by the present inventors are not necessarily satisfactory completely by themselves, in respect of their effects for improving the bread-making properties of farinaceous bread flour or a bread-making dough, and now there is not yet available such a gluten product which, by itself, is able to render the bread-making dough highly tolerant to the mechanical workings of the dough.

DETAILED DESCRIPTION OF THE INVENTION ln the situations as explained above, we have now made our further researches eagerly in an attempt to provide such a new modified gluten product which is inherently able to impart farinaceous bread flour or a bread-making dough with some improved bread-making properties and also is able to render the bread-making dough preparations highly tolerant to the machanical workings of the dough when said modified gluten product is added into farinaceous bread flour or the bread-making dough preparations. As a result of our further researches, we have now found that when the traditional methods of preparing gluten is so modified that wheat flour is mixed with L-ascorbic acid and cystine and the result mixture is kneaded together with a volume of water added, and when the resulting semi-solid and dough-like hydrated flour mixture comprising the wheat flour, L-ascorbic acid, cystine and water is then mechanically damaged or broken down with regard to its structure, or particular, is mixed under a high shearing force so that the molecules of gluten are mechanicaly divided into ones of smaller sizes until the content of such proteins which are soluble in an aqueous acetic acid is increased, much than the initial content, it becomes feasible to separate or recover from the resultinghigh-shear-mixed, dough-like hydrated flour mixture such a new modified gluten product which, by itself, is albe to exhibit the remarkably enhanced effects for improving the bread-making properties of farinaceous bread flour or a bread-making dough and also is able to render the bread-making dough favorably tolerant to the mechanical workings of the dough.

The aforesaid dough-like hydrated flour mixture which has been worked or processed by the mechanically damaging process or particularly the high-shear-mixing process as above where the dough-like hydrated flour mixture as kneaded has been further mixed under a high shearing force to effect the break-down of the gluten molecules into the smaller ones is having as increased content of such proteins which are soluble in aqueous acetic acid, as compared to the initial content of the acetic acid-soluble proteins present in the dough-like hydrated flour mixture before it has been worked or processed by the mechanically damaging process or particularly the high-shear-mixing process. Separation or recoveryof the above new modified gluten product from the mechanically damaged or high-shear-mixed, dough-like hydrated flour mixture may be achieved by washing the latter mechanically damaged or high-shear-mixed, hydrated flour mixture repeatedly with water (if necessary, after said mixture is allowed to stand for a while) in such a way that the water-insoluble, modified gluten product is isolated from the water-insoluble starch fraction or starchy material and also from the water-soluble substances existing in said mechanically damaged or high-shear-mixed, hydrated flour mixture by means of the above mentioned repeated water-washing process. This invention is accomplished on the basis of the above findings.

According to a first aspect of this invention, therefore, there is provided a new modified gluten product which is prepared by kneading a mixture of wheat flour, L-ascorbic acid, cystine and water, then giving a mechanical damage to the resulting dough-like hydrated flour mxiture so kneaded, or particularly, mixing the resulting dough-like hydrated flour mixture so kneaded, under a high shearing force, until the dough-like hydrated flour mixture becomes to contain the proteins which are soluble in 0.05 N aqueous acetic acid, at an amount or content of 75 to 85% (by weight) as calculated on the basis of the total content of the proteins present in said dough-like hydrated flour mixture, and subsequently separating the water-insoluble, modified gluten product from the dough-like hydrated flour mixture which has been worked or processed by the mechanically damaging step, or particularly the high-shearing-mixing step.

The term "kneading" as used herein means that the mixture of wheat flour, L-ascorbic acid, cystine and water is agitated and mixed uniformly to a degree sufficient to invoke that the gluten protein is produced from the initial protein components present in the raw wheat flour. The term "hydrated flour mixture" as used herein means and embraces such semi-solid mass or so-called dough which is obtained by kneading well a mixture of wheat flour, L-ascorbic acid, cystine and a proportion of water.

Now, the methods for the preparation of the new modified gluten product according to this invention are described below.

For the preparation of the new modified gluten product, no particular limitation is imposed on the nature or sort of the wheat flour employed. Any sort of wheat flour which is prepared by the conventional method of milling any sort of wheat grains cultivated may be available. For the preparation of the new modified gluten product of this invention, however, strong wheat flour, that is, high-protein, hard-wheat flour is preferred in particular. Usually, L-ascorbic acid is a reducing agent, but during the dough-mixing of wheat flour, L-ascorbic acid is subjected to the action of wheat enzyme and oxidized rapidly to dehydroascorbic acid, which can act as an oxidant, as be known previously.

In order to produce the new modified gluten product according to the first aspect of this invention, wheat flour, L-ascorbic acid cystine and water are mixed together and kneaded, first of all. The proportions of the L-ascorbic acid and cystine may preferably be 10–1,000 ppm, notably, 50–500 ppm based on the wheat flour, respectively. Any respective proportions of the L-ascorbic acid and cystine of less than 10 ppm will not be able to provide a desired modified gluten product having the enhanced effects sufficient to improve the bread-making properties. On the other hand any respective proportions of the L-ascorbic acid and cystine each in excess of 1,000 ppm will undesirably result in formation of such a bread-making dough of which the formation of dough texture or structure is inhibited or delayed upon the baking step.

In general, the proportion of water may preferably be 40%–150% by weight of the wheat flour employed. L-ascorbic acid and cystine may be added to wheat flour or may be dissolved in water, optionally together with an emulsifier such as aliphatic acid esters of saccharides and the like. L-ascorbic acid and cystine each may preferably be dissolved in water. The kneading can be effected by a method known per se in the art to an extend sufficient to produce the gluten proteins. The kneading may be effected at 5°–40° C. for 1–20 minutes in a vertical dough mixer or the like at a low mixing speed to a medium mixing speed. A semi-solid and dough-like, hydrated flour mixture is obtained by this kneading method.

With the dough-like, hydrated flour mixture so kneaded and obtained, its content of the proteins which are soluble in 0.05 N aqueous acetic acid is normally at an amount of 50 to 70% (by weight) as calculated on the basis of the total content of proteins present in the dough. In accordance with this invention, the dough-like, hydrated flour mixture is then subjected to the mechanically damaging treatment or particularly the high-shear-mixing process so that the gluten molecules are mechanically broken down into the smaller onesunder the shearing force and until the content of the proteins soluble in 0.05 N aqueous acetic acid is increased to an amount in a range of 75 to 85% (by weight) based on the total protein content of said dough. This mechanically damaging treatment, or particularly the high-shear-mixing process is conducted, for example, by passing the doughlike, hydrated and kneaded flour mixture (i.e. the dough) through an extruder or a meat-chopper or a similar machine which can mix the dough under a high shearing force, or alternatively by mixing the dough at a high mixing speed to an excessive degree. Usually, it is not likely that the content of the acetic acid-soluble proteins present in the dough so treated by the mechanically damaging treatment or the high-shear-mixing process would exceed a value of 85%. However, if the content of the acetic acid-soluble proteins exceeded 85%, it can unfavorably become difficult to separate the desired gluten product from the dough so excessively treated.

The measurement of the content of the proteins soluble in 0.05 N aqueous acetic acid may be carried out by the following procedure. Thus, the dough which have been worked or processed by the mechanically damaging treatment or particularly the high-shearmixing process is freeze-dried and pulverized into a fine powder which can pass a 100 mesh-sieve. One gram-portion of the so pulverized dough is taken and added into 20 ml of 0.05 N aqueous acetic acid, and the resulting suspension is agitated at 5° C. for 1 hour and then centrifuged (at a centrifugal force of 5,000×g, for 20 minutes) to give the clear supernatant solution and the solid residue. The supernatant solution so obtained is analyzed for its content of the proteins dissolved in said solution, with aid of the microKelder method, and the value of the amount of the aoluble proteins so measured is calculated in term of its percentages on the basis of the total protein content of the pulverized dough.

The dough-like hydrated flour mixture thus mechanically damaged or worked by the high-shear-mixing process is then processed in a usual manner known in the preparation of gluten. For example, after allowing said mixture to stand for a while if necessary, said mixture may be subjected to repeated water-washing step and then to screening, centrifugation or other methods so that the gluten product and the starchy material are separated from each other and also from the water-soluble components of the present in said mixture.

The modified gluten product so obtained by this inventionmay be used as a raw or wet gluten material as such, or alternatively it may be dried into gluten powder by a dehydrating method such as freeze-drying, spray-drying or hot-air-drying.

When the new modified gluten product of this invention is added to farinaceous flour for production of bread, the bread-making dough as prepared therefrom is favorably tolerant to the mechanical workings of the dough upon the bread-making process, and also the bread product prepared will have an increased volume, white and well-extended cellular crumb, improved external appearance and improved crumb smoothness or palatability for better chewing mouth feel. Furthermore, the fermentation or leavening time required in the bakery process of making bread can be shortened by about 60 minutes in the straight-dough process and by about 90 minutes in the sponge-dough process. Upon use of the modified gluten product as prepared by this invention as the bread improver, it is preferable to add the bread improver in an amount of 0.1-10%, especially 0.5-5% by weight based on the farinaceous flour for making bread.

In addition, the new modified gluten product prepared as above according to this invention can also be used as a raw material for porduction of artificial meat, baked wheat-gluten bread or the like.

According to a particular embodiment of the first aspect of this invention, there is provided a water-insoluble, modified gluten product which is prepared by (i) kneading a mixture of wheat flour, L-ascorbic acid in a proportion of 10 to 1,000 ppm. of L-ascorbic acid, cystine in a proportion of 10 to 1,000 ppm. of cystine each based on the weight of the wheat flour, and water in a propotion of 40 to 150 % of water based on the weight of the wheat flour, at a temperature of 5° C. to 40° C., (ii) mixing the resulting kneaded, dough-like hydrated flour mixture under a high shearing force by means of meat-chopper or extruder or by excessive mixing or stirring at high speed, until the content of the proteins soluble in 0.05 N aqueous acetic acid is increased to an amount of 75–85% by weight based on the total protein content, and (iii) then washing the resulting high-shear-mixed, hydrated flour mixture dough with water repeatedly to separate the water-insoluble, modified gluten product from the starch, the other water-insoluble substances and the water-soluble proteinaceous substance present in said high-shear-mixed, hydrated flour mixture dough.

The actual and exact composition of the abovementioned water-insoluble, modified gluten product according to the first aspect of this invention has not yet been elucidated by the present inventors. Meanwhile, we have some study to investigate the actual composition of said modified gluten product of this invention, and it has presently been found that the new modified protein product of this invention contains the n-hexane-extractable free lipids and the bound lipids (not extractable with n-hexane but extractable with water-saturated n-butanol) each in significant proportions in contrast to the conventional vital gulten which normally contains the free lipids at a total amount of about 0.9% to about 1.5% by weight and the bound lipids at a total amount of about 6% to 7% by weight, and also that the new modified gluten product of this invention contains no substantial amount of free fatty acids extractable with ethyl ether but contains monoglycerides at an amount higher than those present in the conventional vital gluten which normally contains monoglycerides in at a total amount of about 18% (as % of the total free lipids extractable with ethyl ether). Furthermore, it has now been found that the new modified gluten product of this invention and the conventional vital gluten both contains triglycerides.

The simple lipids such as the aliphatic acids, monoglycerides and triglycerides present in the water-insoluble, modified gluten product of this invention may be determined in such way that a dried sample of the modified gluten product was extracted with ethyl ether in Soxhlet's extractor and the extract obtained is separated by thin layer chromatography (TLC) (eluent: hexane-ethyl ether-acetic acid, 80:20:1) and the corresponding areas of these apliphatic acids, monoglycerides and triglycerides appearing in the chromatogram are quantitatively analysed using a densitometer (Dual-Wavelength Chromoto-Scanner, CS-930, Shimadzu Co.).

Moreover according to a second aspect of this invention, there is provided a process for preparing a modified gluten prouct, which comprises (i) kneading a mixture consisting of wheat flour, L-ascorbic acid in a proportion of 10 to 1,000 ppm. of L-ascorbic acid, cystine in a proportion of 10 to 1,000 ppm. of cystine each based on the weight of the wheat flour and water in a proportion of 40 to 150% of water based on the weight of the wheat flour, at a temperature of 5° C. to 40° C. for 1 to 20 minutes, (ii) mixing the resulting kneaded, dough-like hydrated flour mixture under a high shearing force by means of meat-chopper or extruder or by excessive mixing or stirring at high speed, until the content of the proteins soluble in 0.05 N aqueous acetic acid is increased to an amount of 75-85% by weight based on the total protein content, and (iii) washing the resulting high-shear-mixed, hydrated flour mixture dough with water repeatedly to separate the water-insoluble, modified gluten product from the starch, the other water-insoluble substances and the water-soluble proteinaceous substance present in said high-shear-mixed, hydrated flour mixture dough.

The new modified gluten product as obtained according to the first aspect of this invention exhibits the effects for improving the bread-making properties of a farinaceuos bread flour or a bread-making dough and also is capable of rendering the bread-making dough favorably tolerant to the mechanical workings of the dough. Still, however, this new modified gluten product of the first aspect of this invention is not yet satisfactory in respect of its ability to afford such a bread-making dough which is highly or well tolerant to the mechanical workings of the bread-making dough.

Thus, we have made another researches, and as a result we have now found that when a composition is prepared by mixing the aforesaid modified gluten product of the first aspect of this invention with cystine and an emulsifier, the compostion so prepared is able to show the enhanced effects for improving the bread-making properties of the farinaceous bread flour or the bread-making dough and also is able to render the bread-making dough excellently or remarkably tolerant to the mechanical workings of the bread-making dough. On the basis of this finding, we have completed another invention.

According to the third aspect of this invention, therefore, there is provided a bread improver composition consisting essentially of a mixture of (A) a modified gluten product which is prepared by kneading a mixutre of wheat flour, L-ascorbic acid, cystine and water, then giving a mechanical damage to the resulting dough-like hydrated flour mixture so kneaded or particularly, mixing the resulting dough-like hydrated flour mixture so kneaded, under a high shearing force, until the dough-like hydrated flour mixture becomes to contain the proteins which are soluble in 0.05 N aqueous acetic acid, at an amount or content of 75 to 85% (by weight) as calculated on the basis of the total content of the proteins present in said dough-like hydrated flour mixture, and subsequently separating the water-insoluble, modified gluten product from the dough-like hydrated flour mixture which has received the mechanically damaging step or particularly the high-shear-mixing step, (B) cystine and (C) at least one emulsifier.

The modified gluten product which constitutes the component (A) of the bread improver composition according to the third aspect of this invention may be prepared by the same methods as described for the first aspect of this invention.

The emulsifier which constitutes the component (B) of the bread improver composition according to the third aspect of this invention may preferably be such one which show an HLB value of 3 to 10. If the HLB value of the emulsifier as employed is lower than 3, crumb cells of the bread product as made is rather thicker unfavorably. If the HLB value of the emulsifier as employed is higher than 10, the bread-making dough as prepared is poorer in its tolerance to the mechanical workings of the dough. Suitable examples of the emulsifiers available for the purpose of third aspect of this invention include aliphatic acid esters of saccharides, aliphatic acid esters of glycerine, aliphatic acid esters of propyleneglycol, sorbitan mono-stearated and the like.

The bread-improver composition of the third aspect invention is in the form of a mixture of (A) the modified gluten product, (B) cystine and (C) at least one emulsifier. In this mixture, the proportion of the cystine (B) is preferably in a range of 0.001 to 0.05%, especially 0.005 to 0.02% by weight based on the weight of the modified gluten product (A); and the proportion of the emulsifier (C) is preferably in a range of 0.05 to 2%, especially 0.1 to 0.5% by weight based on the weight of the modified gluten product (A) (as calculated on the dry weight basis).

When the bread improver composition according to the third aspect of this invention is incorporated into a farinaceous bread flour or a bread-making dough in a small amount of e.g., 0.05 to 5%, preferably of 0.1 to 2% by weight of said composition on the basis of the dry weight of the farinaceous bread flour or the bread-making dough, it is feasible to prepare such a bread-making dough which can show a remarkably imporved tolerance to the mechanical workings of the dough, such as mechanical division and shaping of the dough, and which also can produce a bread product or bakery product having improved volume, improved crumb texture, improved crumb smoothness and improved external appearance or profile of the bread.

This invention is now illustrated with reference to the following Examples, to which this invention is not limited in any way.

EXAMPLE 1

(i) Preparation of modified gluten

To 1 Kg aliquots of hard-wheat flour (having a protein content of 12.9%) were added various additives as specified in Table 3 given hereinafter, in accordance with the formulation indicated in Table 3, namely to the wheat flour were added water, L-ascorbic acid, cystine and an aliphatic acid ester of saccharide in the amounts as indicated in Table 3. The resulting mixtures each were kneaded in a vertical dough mixer for 2 minutes at a low mixing speed and for 30 seconds at a medium mixing speed to give the dough-like hydrated flour mixtures. The resulting hydrated flour mixture doughs were each then subjected to the mechanically damaging treatment by mixing the dough under high shearing force through the excessive and high speed mixing process, with or without subsequent treatment with meat-chopper, under such conditions of the high- shear-mixing process as detailed in Table 3. The dough so processed, which had received the above-mentioned mechanically damaging treatment, namely the high-shear-mixing process, was then immersed in water for 10 minutes and subsequently washed with a flowing stream of water in accordance with the Martin process to separate the modified gluten product from the dough. The modified gluten product so obtained was freeze-dried and ground into powdery gluten sample as an exemplary, modified gluten product according to the first aspect of this invention.

For the sake of comparison, a comparative sample of a vital gluten was prepared by the same procedure as above, from another aliquot of the same wheat flour, except that the additions of L-ascorbic acid, cystine the saccharide aliphatic acid ester were omitted. Again, further comparative samples of modified gluten products were prepared by the same procedure as above from still another aliquots of the same wheat flour, except that the additions of some of L-ascorbic acid, cystine and the saccharide aliphatic acid ester, as well as the teatment with meat-chopper were omitted. With the gluten samples obtained, their content of the proteins soluble in 0.05 N aqueous acetic acid were determined by the method as described hereinbefore.

(ii) Production of bread products

The powdery samples of the modified gluten products of this invention obtained as above in this Example 1 (i), as well as the comparative gluten samples prepared as above were separately added in a proportions as indicated in Table 3 to aliquots of a farinaceous bread flour mix having the formulation of sweet yeast dough (each aliquot totally weighing ca. 1979g) as specified in Table 1 given below.

TABLE 1

| Formulation of the farinaceous bread flour mix to prepare the bread-making dough | |
|---|---|
| Ingredients | Amounts |
| Bread-making wheat flour | 1,000 g |
| Yeast food | 1.0 g |
| Yeast | 50 g |
| Sugar | 250 g |
| Common Salt | 8 g |
| Skimmed mild milk | 20 g |
| Whole egg liquor | 100 g |
| Shortening | 100 g |
| Water | 450 ml |
| Total ca. | 1,979 g. |

The steps for the production of the bread product were carried out as follows:- Thus, after mixing the gluten sample prepared as above, and all the ingredients of the formulation of the farinaceous bread flour mix mentioned above together but without addition of the shortening, followed by mixing the resulting dough with the shortening as added, the resulting mixture in the dough form was subjected to the bread-making steps according to the sweet yeast straight-dough process, as detailed below:

Mixing of dough:

Thus, the gluten sample and all the ingredients for the bread-making dough other than the shortening were placed together in a mixer and kneaded for 2 minutes at low mixing speed and for 3 minutes at medium mixing speed. The shortening was then added to the resulting dough kneaded dough, followed by further kneading the dough for 2 minutes at medium mixing speed and for 3 minutes at high mixing speed.

Temperature of 28° C. the finally kneaded dough:

Fermentaiton: The fermentation or leavening was effected at a temperature of 27° C. for a time of 60 mintues.

Punching: The leavened dough was then punched.

Mal-treatment of The punched dough was intentionally the dough: mal-treated by the meat-chopper treatment to give mechanical impact or damage to the dough.

Division and The dough so mal-treated was then molding: divided into small masses each of 60 g, and the masses were each molded into a round buns-shape by hands.

Pan proofing: Pan proofing was effected at a temperature of 38° C. for a time of 60 minutes under a humidity of 88%.

Baking: Baking of the buns-shaped dough into bread was effected at a temperature of 220° C. for a time of 8 minutes.

Besides, the above-mentioned bakery process for the production of the bread products was repeated without addition of any gluten (for Control Example).

(iii) Estimation and evaluation of quality of bread products

In the course of the above-mentioned steps for the production of the bread products, the tolerance of the bread-making dough to the mechanical workings of the dough was tested by effecting the aforesaid mal-treatment of the dough, where the punched, leavened dough was passed through a meat chopper to give a mechanical damage or impact to the dough. The tolerance of the bread-making dough to its mechanical working can be estimated by evaluating the degree of the recuperative power of the so mal-treated dough to recover the original qualitites of such bread product. Briefly, in other words, the recuperative power of the aforesaid mal-treated dough would be measured and evaluated by comparing between the quality of such buns as produced with having received the mal-treatment and the quality of such buns as produced without having received the mal-treatment.

The bread-making dough, after the punching and subsequent mal-treatment, was divided and molded by hands into round shaped buns each of 60 g, which were then baked into round-shaped buns bread products. The qualities of the round-shaped buns bread products so obtained were estimated by the following estimation method:- Thus the buns bread was cut vertically through it the center of the bread, and the qualities of the cross-sectioned faces of the buns bread were evaluated by 5 panellers in accordance with the evaluation standard ratings as indicated in Table 2 given hereinafter. Concurrently, the outer profile or shape of the bread products was evaluated and compared between the respective buns bread products to judge whether the outer profile or shape of the buns bread product was favorable to consumers. The outer profile of the bread product was evaluated by measuring the maximum widness (A) of the cross-sectioned face of the bread, the length (B) of the bottom of the crosssectioned face of the bread and the height (C) of the cross-sectioned face of the bread as diagramatically shown in FIG. 1 of the attached drawing. From the measured values of A, B and C, there were calculated the value of a quotient a (=C/B) and the value of a quotinet (=C/A). The extent of the favorite for the outer profile of the bread is evoluated as expressed in term of the difference value of (a - b). In this expression, it is meant that the higher the difference value of (a - b), the better the outer profile of the bread. In other words, it means that when the value of (a - b) is higher, the outer profile of the bread looks well-figured and taller and is more favorable to the consumers, and that when the value of (a - b) is lower, the outer profile of the bread looks more or less flattened and is less favorable to the consumers. The results of these estimation and evaluation tests are summarized in Table 3 given hereinafter.

TABLE 2

| Standards ratings for estimation of the qualities of bread | | |
|---|---|---|
| Estimated Items | Score | Descriptions |
| Crub texture | 4 | Thin and coarse cellular walls of the crumb. |
|  | 3 | Somewhat thick and coarse cellular walls of the crumb. |
|  | 2 | Thick and somewhat fine cellular walls of the crumb. |
|  | 1 | Thick and coarse cellular walls of the crumb. |
| Crumb Palatability | 4 | Highly elastic and soft. |
|  | 3 | Slightly elastic and soft. |
|  | 2 | Slightly sticky. |
|  | 1 | Sticky. |

TABLE 3

| Items of experimental conditions and observations | Control Example Test 1 | Comparative Examples | | | | Examples of this Invention | | | | | | |
|---|---|---|---|---|---|---|---|---|---|---|---|---|
| | | Test 1 | Test 2 | Test 3 | Test 4 | Test 1 | Test 2 | Test 3 | Test 4 | Test 5 | Test 6 | Test 7 |
| Components and parameters for preparation of modified gluten | | | | | | | | | | | | |
| Formulation of components as mixed for preparation of modified gluten | | | | | | | | | | | | |
| Wheat flour (g) | — | 1000 | 1000 | 1000 | 1000 | 1000 | 1000 | 1000 | 1000 | 1000 | 1000 | 1000 |
| Water (ml) | — | 700 | 700 | 700 | 700 | 700 | 700 | 700 | 700 | 700 | 700 | 700 |
| L-ascorbic acid (g) | — | — | 0.1 | — | 0.1 | 0.01 | 0.1 | 1.0 | 0.1 | 0.1 | 0.1 | 0.1 |
| Cystine (g) | — | — | — | 0.1 | 0.1 | 0.01 | 0.1 | 1.0 | 0.1 | 0.1 | 0.1 | 0.1 |
| Saccharide aliphatic acid ester | | | | | | | | | | | | |

TABLE 3-continued

| Items of experimental conditions and observations | Control Example Test 1 | Comparative Examples | | | | Examples of this Invention | | | | | | |
|---|---|---|---|---|---|---|---|---|---|---|---|---|
| | | Test 1 | Test 2 | Test 3 | Test 4 | Test 1 | Test 2 | Test 3 | Test 4 | Test 5 | Test 6 | Test 7 |
| (the Emulsifier) (g):- | | | | | | | | | | | | |
| Emulsifier of HLB 3 | — | — | — | — | — | — | 2.0 | — | — | — | — | — |
| Emulsifier of HLB 7 | — | — | 2.0 | 2.0 | — | 2.0 | — | — | — | 0.5 | 0.5 | 0.5 |
| Emulsifier of HLB 15 | — | — | — | — | — | — | — | 2.0 | — | — | — | — |
| Conditions for the high-Shear-mixing process | | | | | | | | | | | | |
| Time for excessive and high speed mixing (Minutes) | — | 0.5 | 0.5 | 20 | 0.5 | 0.5 | 0.5 | 0.5 | 20 | 0.5 | 0.5 | 0.5 |
| Treatment with meat-chopper (done or not) | Not done | Done | Done | Done | Not done | Done | Done | Done | Not done | Done | Done | Done |
| Nature of modified gluten product | | | | | | | | | | | | |
| Content (%) of Proteins soluble in 0.05 N aqueous acetic acid | — | 76.8 | 78.5 | 80.5 | 73.7 | 79.5 | 79.0 | 79.8 | 80.4 | 78.6 | 78.6 | 78.6 |
| Amount of additives to the farinaceous bread flour mix for production of bread product | | | | | | | | | | | | |
| Modified gluten product (g) (per 1979 g of the whole ingredients of the farinaceous bread flour mix for preparing the bread-making dough) | None | 30 | 30 | 30 | 30 | 30 | 30 | 30 | 30 | 1 | 30 | 50 |
| Results of estimation and evaluation tests of bread product | | | | | | | | | | | | |
| Volume of bread (ml) | 200 | 206 | 210 | 209 | 214 | 229 | 230 | 220 | 222 | 220 | 230 | 226 |
| Estimation and evaluation of bread product (scored) | | | | | | | | | | | | |
| Outer profile (evaluated by the value of (a − b)) | 0.02 | 0.05 | 0.09 | 0.07 | 0.11 | 0.20 | 0.22 | 0.22 | 0.23 | 0.15 | 0.19 | 0.22 |
| Crumb | 1.0 | 1.2 | 1.4 | 1.2 | 1.4 | 2.6 | 2.9 | 2.6 | 2.9 | 2.2 | 2.9 | 2.6 |
| Crumb palatability | 1.0 | 1.1 | 1.2 | 1.2 | 1.4 | 2.6 | 2.9 | 2.2 | 2.6 | 2.2 | 3.0 | 2.6 |

EXAMPLE 2

(i) Preparation of modified gluten

The procedures for the preparation of the modified gluten products were repeated in the same manner as described in Example 1 (i), to prepare powdery gluten samples as exemplary, modified gluten product of the first aspect of this invention.

Comparative sample of the vital gluten and further comparative samples of certain modified gluten products were prepared similarly as described in Example 1 (i).

(ii) Production of bread products

A bread improver composition according to the second aspect of this invention, which was composed of the modified gluten sample as prepared in this Example 2 (i) above, cystine and a saccharide aliphatic acid ester (as the emulsifier), was formulated by mixing these components together, and the bread improver composition as prepared was added in such proportions of the respective components as indicated in Table 4 given hereinafter, to aliquot of a farinaceous bread flour mix having the formulation (each aliquot totally weighing ca. 1979 g) specified in Table 1 above. In comparative tests, the addition of one or more of the modified gluten product component, the cystine component and the emulsifier component was occasionally omitted, and eventually the L-ascorbic acid was supplemented in a proportion as indicated in Table 4. In a Control Example, no gluten was added.

The steps for the production of the buns bread products were repeated in the same manner as described in Example 1 (ii), using the farinaceous bread flour mix formulation so prepared.

(iii) Estimation and evaluation of quality of bread products

The quality of the buns bread products so obtained was extimated for the crumb texture and crumb palatability of the buns bread product in accordance with the estimation standard scores of Table 2 above by 5 panellers in the same manner as described in Example 1 (iii), and the outer profile of the bread product was evaluated in term of the estimated difference value of (a - b) as calculated from the sizes (A, B and C) of the vertical cross-sectioned face of the bread product, in the same manner as described in Example 1 (iii).

The results of these estimation and evaluation tests are summarized in Table 4 given below.

TABLE 4

| Item of experimental conditions and observations | Control Example Test 1 | Comparative Examples | | | | | | Examples of this Invention | | | | | | |
|---|---|---|---|---|---|---|---|---|---|---|---|---|---|---|
| | | Test 1 | Test 2 | Test 3 | Test 4 | Test 5 | Test 6 | Test 1 | Test 2 | Test 3 | Test 4 | Test 5 | Test 6 | Test 7 |
| Components and parameters for preparation of modified gluten | | | | | | | | | | | | | | |
| Formulation of components as mixed for preparation of modified gluten | | | | | | | | | | | | | | |
| Wheat flour (g) | — | — | 1000 | 1000 | 1000 | 1000 | 1000 | 1000 | 1000 | 1000 | 1000 | 1000 | 1000 | 1000 |
| Water (ml) | — | — | 700 | 700 | 700 | 700 | 700 | 700 | 700 | 700 | 700 | 700 | 700 | 700 |
| L-ascorbic acid (g) | — | — | — | 0.1 | — | 0.1 | 0.1 | 0.1 | 1.0 | 0.01 | 1.0 | 1.0 | 1.0 | 1.0 |
| Cystine (g) | — | — | — | — | 0.1 | 0.1 | 0.1 | 0.1 | 1.0 | 0.01 | 1.0 | 1.0 | 1.0 | 1.0 |
| Saccharide aliphatic acid ester (the Emulsifier) (g): | | | | | | | | | | | | | | |
| Emulsifier of HLB 3 | — | — | — | — | — | — | — | — | — | — | — | 20.0 | — | — |
| Emulsifier of HLB 7 | — | — | — | 2.0 | 2.0 | 2.0 | 2.0 | 2.0 | 20.0 | 0.5 | — | — | — | — |
| Emulsifier of HLB 15 | — | — | — | — | — | — | — | — | — | — | — | — | 20.0 | 20.0 |
| Conditions for the high-shear-mixing process | | | | | | | | | | | | | | |
| Time for excessive and high speed mixing (Minutes) | — | — | 0.5 | 0.5 | 20 | 0.5 | 0.5 | 0.5 | 0.5 | 0.5 | 20 | 0.5 | 0.5 | 2.0 |
| Treatment with meat-chopper (done or not) | Not done | Done | Done | Done | Done | Done | Done | Done | Done | Done | Not done | Done | Done | Done |
| Nature of modified gluten product | | | | | | | | | | | | | | |
| Content (%) of proteins soluble in 0.05 N aqueous acetic acid | — | — | 77.0 | 78.5 | 80.5 | 79.0 | 79.5 | 79.2 | 81.5 | 79.2 | 78.2 | 77.6 | 78.6 | 81.9 |
| Amount of additives to the farinaceous bread flour mix for production of bread product | None | — | 20 | 20 | 20 | 20 | 20 | 20 | 20 | 20 | 20 | 20 | 20 | 50 |
| Modified gluten product (g) (per 1979 g of the whole ingredients of the farinaceous bread flour mix for preparing the bread-making dough) | — | — | 0.005 | — | 0.005 | — | — | — | — | — | — | — | — | — |
| L-ascorbic acid (g) (per 1979 g of the whole ingredients of the farinaceous bread flour mix for preparing the bread-making dough) | 0.005 | 0.005 | — | — | — | — | — | — | — | — | — | — | — | — |

TABLE 4-continued

| Item of experimental conditions and observations | Control Example Test 1 | Comparative Examples | | | | | | Examples of this Invention | | | | | | |
|---|---|---|---|---|---|---|---|---|---|---|---|---|---|---|
| | | Test 1 | Test 2 | Test 3 | Test 4 | Test 5 | Test 6 | Test 1 | Test 2 | Test 3 | Test 4 | Test 5 | Test 6 | Test 7 |
| Cystine (g) (per 1979 g of the whole ingredients of the farinaceous bread flour mix for preparing the bread-making dough) | — | 0.105 | 0.105 | 0.105 | 0.100 | 0.100 | — | 0.100 | 0.100 | 0.100 | 0.100 | 0.100 | 0.100 | 0.500 |
| Saccharide aliphatic acid ester (Emulsifier) (g) (per 1979 g of the whole ingredients of the farinaceous bread flour mix for preparing the bread-making dough): | | | | | | | | | | | | | | |
| Emulsifier of HLB 3 | — | — | — | — | — | — | — | — | — | — | — | — | — | — |
| Emulsifier of HLB 7 | — | 1.088 | 1.088 | 1.000 | 1.000 | — | 1.000 | 1.000 | 1.000 | 1.000 | — | 1.000 | 1.000 | 5.000 |
| Emulsifier of HLB 15 | — | — | — | — | — | — | — | — | — | — | 1.000 | — | — | — |
| Results of estimation and evaluation tests of bread product | | | | | | | | | | | | | | |
| Volume of bread (ml) | 200 | 202 | 205 | 220 | 208 | 210 | 208 | 250 | 240 | 232 | 238 | 229 | 236 | 229 |
| Estimation and evaluation of bread product (scored) | | | | | | | | | | | | | | |
| Outer profile (evaluated by the value of (a − b) | 0.03 | 0.04 | 0.05 | 0.11 | 0.07 | 0.08 | 0.06 | 0.19 | 0.21 | 0.15 | 0.16 | 0.20 | 0.19 | 0.23 |
| Crumb | 1.0 | 1.0 | 1.2 | 2.2 | 1.4 | 1.2 | 1.0 | 3.8 | 3.0 | 2.9 | 3.2 | 3.0 | 3.4 | 2.9 |
| Crumb palatability | 1.0 | 1.0 | 1.0 | 2.2 | 1.6 | 1.4 | 1.0 | 4.0 | 3.2 | 3.0 | 3.0 | 2.6 | 3.4 | 2.9 |

We claim:

1. A water-insoluble, modified gluten which is prepared by kneading a mixture of wheat flour, L-ascorbic acid, cystine and water, then causing a mechanical damage to the resulting dough-like hydrated flour mixture so kneaded, until the dough-like hydrated flour mixture contains proteins which are soluble in 0.05 N aqueous acetic acid, at a content of 75 to 85% as calculated on the basis of the total content of the protein present in said dough-like hydrated flour mixture, and subsequently separating the water-insoluble, modified gluten from the dough-like hydrated flour mixture which has received the mechanical damaging step.

2. A modified gluten according to claim 1, wherein the mixture of wheat flour, L-ascorbic acid, cyctine and water to be kneaded contains L-ascorbic acid in a proportion of 10 to 1,000 ppm and cystine in a proportion of 10 to 1,000 ppm, each based on the weight of the wheat flour.

3. A water-insoluble, modified gluten which is prepared by (i) kneading a mixture of wheat flour, L-ascorbic acid in a proportion of 10 to 1,000 ppm of L-ascorbic acid, cystine in a proportion of 10 to 1,000 ppm of cystine each based on the weight of the wheat flour, and water in a proportion of 40 to 150% of water based on the weight of the wheat flour, at a temperature of 5° C. to 40° C., (ii) mixing the resulting kneaded protein-containing, dough-like hydrated flour mixture under a high shearing force at high speed, until the content of the proteins soluble in 0.05 N aqueous acetic acid is increased to an amount of 75–85% by weight based on the total protein content, and (iii) then washing the resulting high-shear-mixed, hydrated flour mixture dough with water repeatedly to separate the water-insoluble, modified gluten.

4. A process for preparing a modifed gluten, which comprises (i) kneading a mixture consisting of wheat flour, L-ascorbic acid in a proportion of 10 to 1,000 ppm of L-ascorbic acid, cystine in a proportion of 10 to 1,000 ppm of cystine each based on the weight of the wheat flour and water in a proportion of 40 to 150% of water based on the weight of the wheat flour, at a temperature of 5° C. to 40° C. for 1 to 20 minutes, (ii) mixing the resulting kneaded protein-containing, dough-like hydrated flour mixture under a high shearing force at high speed, until the content of the proteins soluble in 0.05 N aqueous acetic acid is increased to an amount of 75–85% by weight based on the total protein content, and (iii) washing the resulting high-shear-mixed, hydrated flour mixture dough with water repeatedly to separate the water-insoluble, modified gluten.

5. A bread improver composition consisting essentially of a mixture of (A) a water-insoluble modified gluten which is prepared by kneading a mixture of wheat flour, L-ascorbic acid, cystine and water, then giving a mechanical damage to the resulting dough-like hydrated flour mixture so kneaded, until the dough-like hydrated flour mixture contains proteins which are soluble in 0.05 N aqueous acetic acid, at a content of 75 to 85% (by weight) as calculated on the basis of the total content of the proteins present in said dough-like hydrated flour mixture, and subsequently separating the water-insoluble, modified gluten from the dough-like hydrated flour mixture which has received the mechanically damaging step, (B) cystine and (C) at least one emulsifier.

* * * * *

UNITED STATES PATENT AND TRADEMARK OFFICE
CERTIFICATE OF CORRECTION

PATENT NO. : 4,879,133

DATED : November 7, 1989

INVENTOR(S) : ENDO et al

It is certified that error appears in the above—identified patent and that said Letters Patent is hereby corrected as shown below:

On the title page, under the Abstract, change "5 Claims, No Drawings" to --5 Claims, 1 Drawing--.

Figure 1, as shown on the attached page, should be added.

Signed and Sealed this

Seventh Day of September, 1993

Attest:

Attesting Officer

BRUCE LEHMAN

Commissioner of Patents and Trademarks